(12) United States Patent
Takeuchi et al.

(10) Patent No.: US 8,640,568 B2
(45) Date of Patent: Feb. 4, 2014

(54) BICYCLE SHIFT CONTROL DEVICE

(75) Inventors: Toshihiko Takeuchi, Osaka (JP);
Kazutaka Fukao, Osaka (JP);
Yoshimitsu Miki, Osaka (JP)

(73) Assignee: Shimano Inc., Osaka (JP)

( * ) Notice: Subject to any disclaimer, the term of this patent is extended or adjusted under 35 U.S.C. 154(b) by 727 days.

(21) Appl. No.: 12/554,065

(22) Filed: Sep. 4, 2009

(65) Prior Publication Data

US 2011/0056319 A1 Mar. 10, 2011

(51) Int. Cl.
*F16C 1/10* (2006.01)

(52) U.S. Cl.
USPC ....................................... 74/502.2

(58) Field of Classification Search
USPC ............... 74/473.13, 473.14, 473.15, 473.3, 74/501.6, 502.2
See application file for complete search history.

(56) References Cited

U.S. PATENT DOCUMENTS

| | | | |
|---|---|---|---|
| 4,768,395 A | 9/1988 | Tagawa | |
| 4,876,913 A | 10/1989 | Romano | |
| 5,186,072 A | 2/1993 | Nagano | |
| 5,682,794 A * | 11/1997 | Shibata | 74/489 |
| 5,787,757 A * | 8/1998 | Ozaki | 74/473.13 |
| 6,502,477 B1 * | 1/2003 | Assel | 74/502.2 |
| 6,805,645 B2 | 10/2004 | Mao et al. | |
| 7,628,095 B2 * | 12/2009 | Funai | 74/502.2 |
| 2007/0193389 A1 * | 8/2007 | Kawakami | 74/502.2 |

FOREIGN PATENT DOCUMENTS

| | | |
|---|---|---|
| CN | 100460272 C | 2/2009 |
| DE | 37 27 505 A1 | 3/1988 |
| EP | 1 281 611 A2 | 2/2003 |
| FR | 2 594 403 | 8/1987 |
| GB | 2 165 900 A | 4/1986 |
| JP | 62-191293 A | 8/1987 |
| TW | 200836969 A | 9/2008 |

OTHER PUBLICATIONS

EP Search Report of corresponding EP Application No. 10 16 1987.2 dated Nov. 3, 2010.
Taiwan Office Action of corresponding Taiwan Application No. 099101977 dated Jul. 26, 2012.

* cited by examiner

*Primary Examiner* — Vicky Johnson
(74) *Attorney, Agent, or Firm* — Global IP Counselors

(57) ABSTRACT

A bicycle shift control device is provided with a shifter housing, a gear shifting mechanism, a shift operating member, and a shift switching arrangement. The gear shifting mechanism is disposed in the shifter housing with the gear shifting mechanism having a plurality of operating positions. The shift operating member is movable with respect to the shifter housing to operate the gear shifting mechanism. The shift switching arrangement includes a restricting member movably mounted with respect to the shifter housing between a non-shift restricting position and a shift restricting position. The gear shifting mechanism moves in a first set of the operating positions when the restricting member is in the non-shift restricting position, and moves in a second set of the operating positions that are different from the first set of the operating positions when the restricting member is in the shift restricting position.

15 Claims, 13 Drawing Sheets

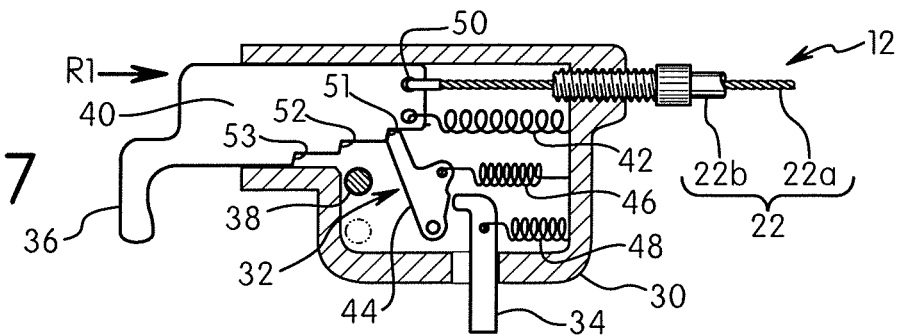
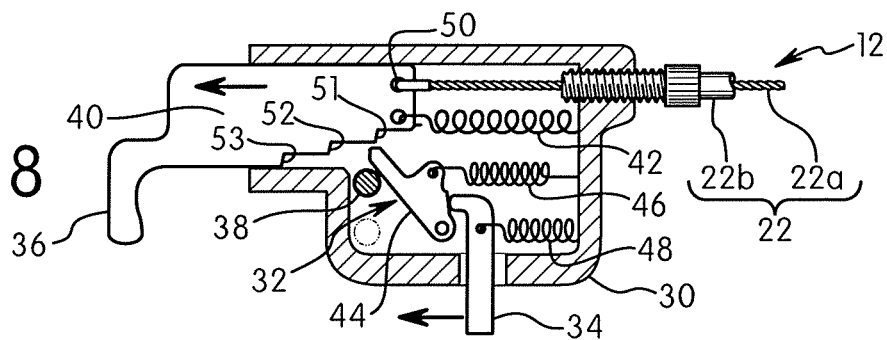
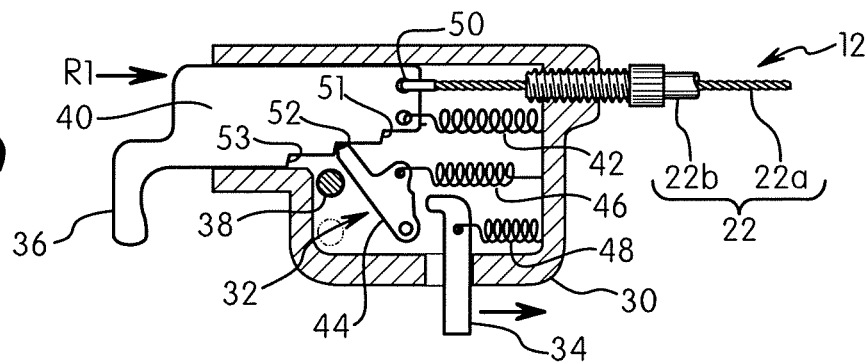

BICYCLE SHIFT CONTROL DEVICE

BACKGROUND OF THE INVENTION

1. Field of the Invention

This invention generally relates to a bicycle shift control device. More specifically, the present invention relates to a bicycle shift control device that allows the rider (user) to selectively regulate the bicycle shift control device between two different sets of the operating positions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In particular, control devices for braking and/or shifting have been extensively redesigned in recent years.

Currently, there are many types of bicycle shift control devices being installed on bicycles. Some bicycle shift control devices are cable operated shifting devices, while others are electrical shifting devices. In some cases, two shift levers are used for shifting, e.g., one for upshifting and one for downshifting. However, in some cases a single shift lever is used for both upshifting and downshifting. In any event, shift control devices are often designed for a specific number of gear shift operations. This is especially the case for mechanical (e.g., cable operated) shift control devices that have an indexing arrangement for positively engaging a selected gear. However, typically, with shift control devices that have an indexing arrangement, the shift control device can only be used with drive trains with a particular number of gears. In other words, indexing types of shift control devices are made for shifting between a particular number of gears. Thus, if, for example, the rider changes from a drive train with two front sprockets to a drive train with three front sprockets, then the rider will need to change the shift control device to match the new drive train.

In view of the above, it will be apparent to those skilled in the art from this disclosure that there exists a need for an improved bicycle shift control device. This invention addresses this need in the art as well as other needs, which will become apparent to those skilled in the art from this disclosure.

SUMMARY OF THE INVENTION

One object of the present invention is to provide a bicycle shift control device that allows the rider to selectively regulate the bicycle shift control device between two different sets of the operating positions.

The foregoing objects can basically be attained by providing a bicycle shift control device that mainly comprises a shifter housing, a gear shifting mechanism, a shift operating member, and a shift switching arrangement. The gear shifting mechanism is disposed in the shifter housing with the gear shifting mechanism having a plurality of operating positions. The shift operating member is operatively connected to the gear shifting mechanism. The shift operating member is movable with respect to the shifter housing to operate the gear shifting mechanism. The shift switching arrangement includes a restricting member movably mounted with respect to the shifter housing between a non-shift restricting position and a shift restricting position. The gear shifting mechanism is arranged to move in a first set of the operating positions when the restricting member is in the non-shift restricting position, and to move in a second set of the operating positions different from the first set of the operating positions when the restricting member is in the shift restricting position.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 7 is a schematic cross sectional view of the bicycle shift control device illustrated in FIGS. 1 to 6, with the wire takeup member in the top gear position and the shift switching arrangement in a shift restricting position;

FIG. 8 is a schematic cross sectional view of the bicycle shift control device illustrated in FIGS. 1 to 7, illustrating a wire release operation in which the wire takeup member is being released from the top gear position to move to the middle gear position while the shift switching arrangement is in the shift restricting position;

FIG. 9 is a schematic cross sectional view of the bicycle shift control device illustrated in FIGS. 1 to 8, with the wire takeup member in the top gear position and the shift switching arrangement in the shift restricting position;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
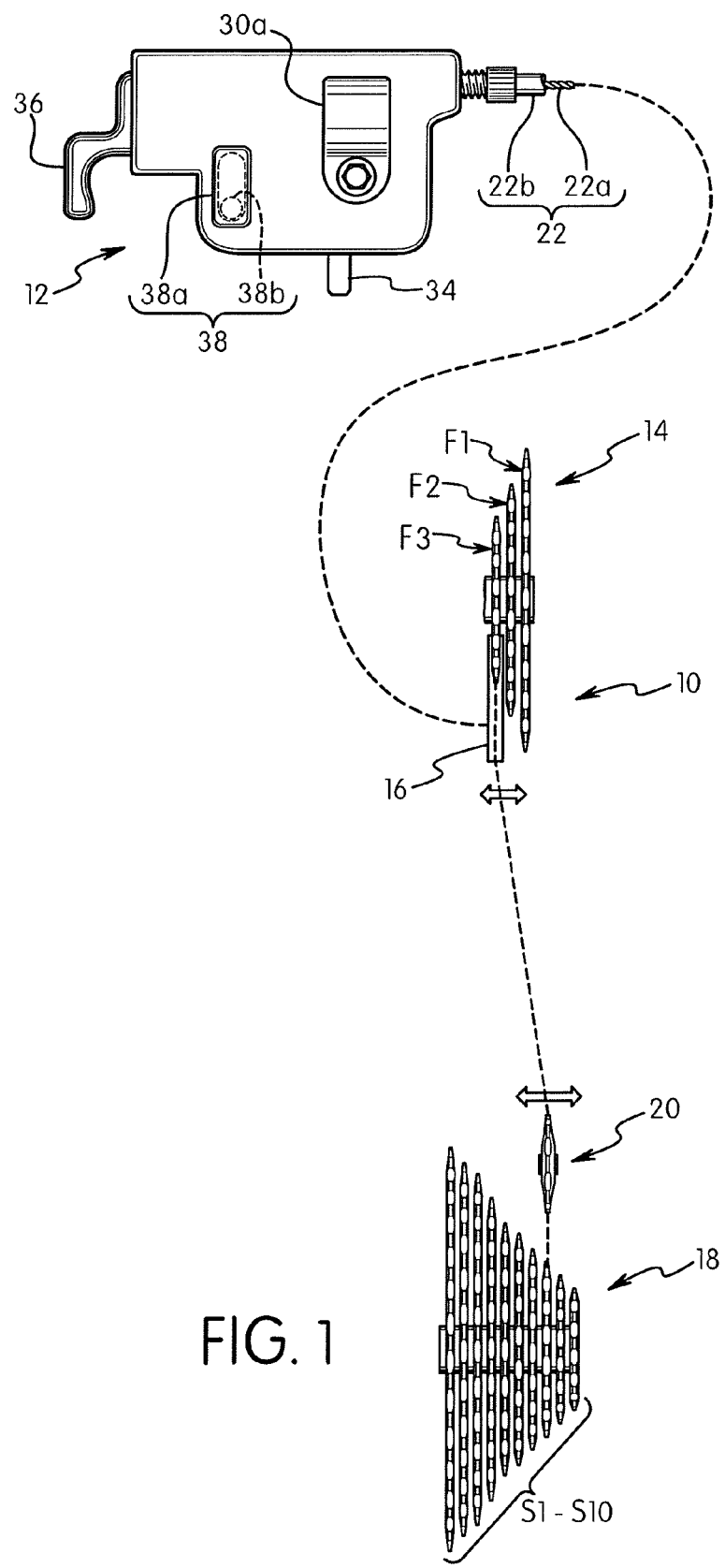
FIG. 1 is a schematic illustration of a portion of a bicycle drive train with three front sprockets and a front derailleur that is shifted by a bicycle shift control device in accordance with a first embodiment.

Referring initially to FIG. 1, a bicycle drive train 10 is schematically is illustrated with a bicycle shift control device 12 in accordance with a first embodiment. The bicycle shift control device 12 allows a rider (user) to selectively regulate the bicycle shift control device 12 between two different sets of the operating positions. More specifically, as explained below, the bicycle shift control device 12 is configured and arranged such that the bicycle shift control device 12 can be used with different bicycle drive trains. For example, in this first illustrated embodiment, the bicycle shift control device 12 can be used to with either a three-front sprocket gear set or a two-front sprocket gear set. Of course, the bicycle shift control device 12 can be used to lockout one or more of the sprockets of a three-front sprocket gear set as needed and/or desired.

As diagrammatically seen in FIG. 1, the bicycle drive train 10 further includes a front gear set 14, a front derailleur 16 (illustrated by a front chain guide), a rear gear set 18 and a rear derailleur 20 (illustrated by a rear guide pulley). In this first illustrated embodiment, the front gear set 14 has three front sprockets F1, F2 and F3. The rear gear set 18 has ten sprockets S1 to S10. The structures forming the front gear set 14, the front derailleur 16, the rear gear set 18 and the rear derailleur 20 can be selected from any suitable structures as needed and/or desired. The precise structures forming the front gear set 14, the front derailleur 16, the rear gear set 18 and the rear derailleur 20 can be conventional structures. Thus, the precise structures forming the front gear set 14, the front derailleur 16, the rear gear set 18 and the rear derailleur 20 will not be discussed herein for the sake of brevity.

Figure 2:
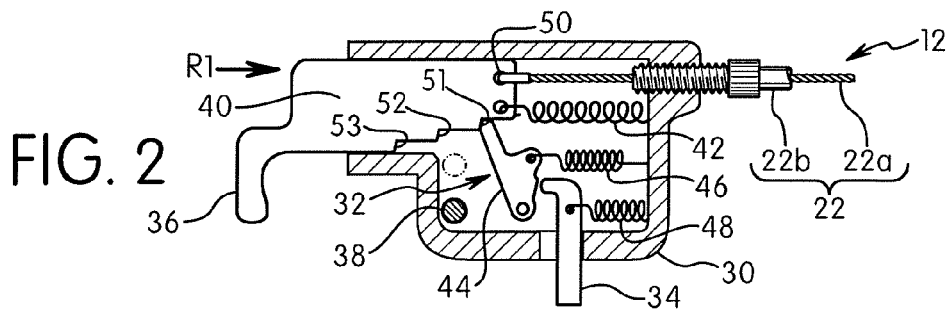
FIG. 2 is a schematic cross sectional view of the bicycle shift control device illustrated in FIG. 1, with the wire takeup member in a top gear position and the shift switching arrangement in a non-shift restricting position.
Figure 3:
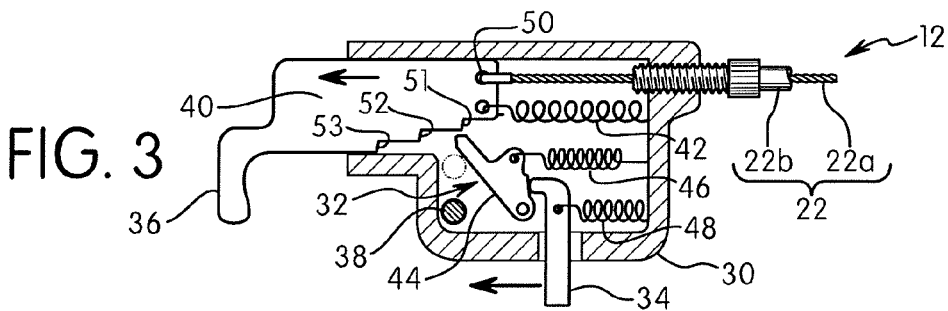
FIG. 3 is a schematic cross sectional view of the bicycle shift control device illustrated in FIGS. 1 and 2, illustrating a wire release operation in which the wire takeup member is being released from the top gear position to move to a middle gear position while the shift switching arrangement is in the non-shift restricting position.
Figure 4:
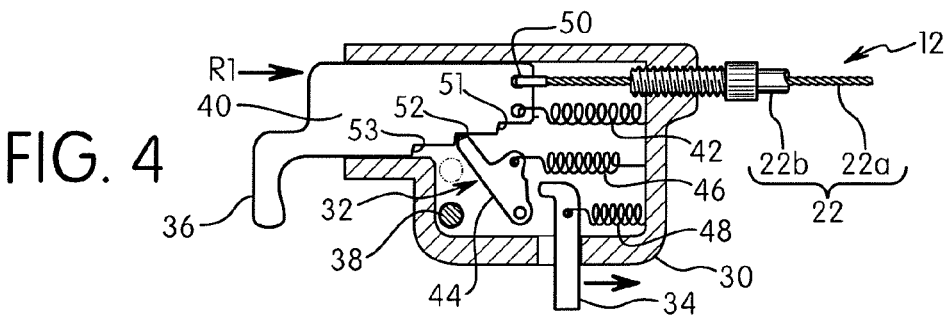
FIG. 4 is a schematic cross sectional view of the bicycle shift control device illustrated in FIGS. 1 to 3, with the wire takeup member in the middle gear position and the shift switching arrangement in a non-shift restricting position.
Figure 5:
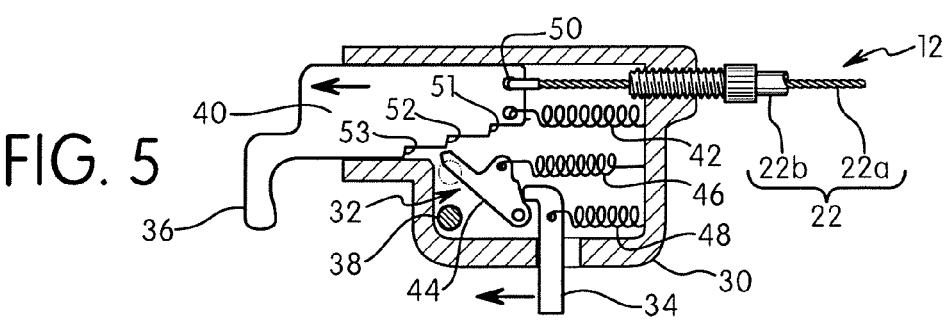
FIG. 5 is a schematic cross sectional view of the bicycle shift control device illustrated in FIGS. 1 to 4, illustrating a wire release operation in which the wire takeup member is being released from the middle gear position to move to a bottom gear position while the shift switching arrangement is in the non-shift restricting position.
Figure 6:
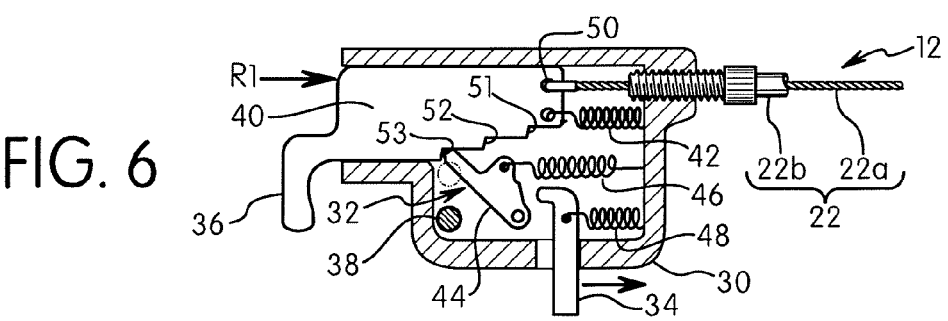
FIG. 6 is a schematic cross sectional view of the bicycle shift control device illustrated in FIGS. 1 to 5, with the wire takeup member in the bottom gear position and the shift switching arrangement is in the non-shift restricting position.

Referring to FIGS. 2-9, various shifting operations of the bicycle shift control device 12 are illustrated. Basically, FIGS. 2 to 4 illustrate a shift releasing operations in which the bicycle shift control device 12 is actuated to shift the front derailleur 16 from a top gear position (i.e., the front derailleur 16 is aligned with the front sprocket F1) to a middle gear position (i.e., the front derailleur 16 is aligned with the front sprocket F2) with the bicycle shift control device 12 set to the non-shift restricting position. FIGS. 4 to 6 illustrate a shift releasing operations in which the bicycle shift control device 12 is actuated to shift the front derailleur 16 from the middle gear position (i.e., the front derailleur 16 is aligned with the front sprocket F2) to a bottom gear position (i.e., the front derailleur 16 is aligned with the front sprocket F3) with the bicycle shift control device 12 set to the non-shift restricting position. FIGS. 7 to 9 illustrate a shift releasing operations in which the bicycle shift control device 12 is actuated to shift the front derailleur 16 from the top gear position (i.e., the front derailleur 16 is aligned with the front sprocket F1) to the middle gear position (i.e., the front derailleur 16 is aligned with the front sprocket F2) with the bicycle shift control device 12 set to the shift restricting position.

Figure 10:
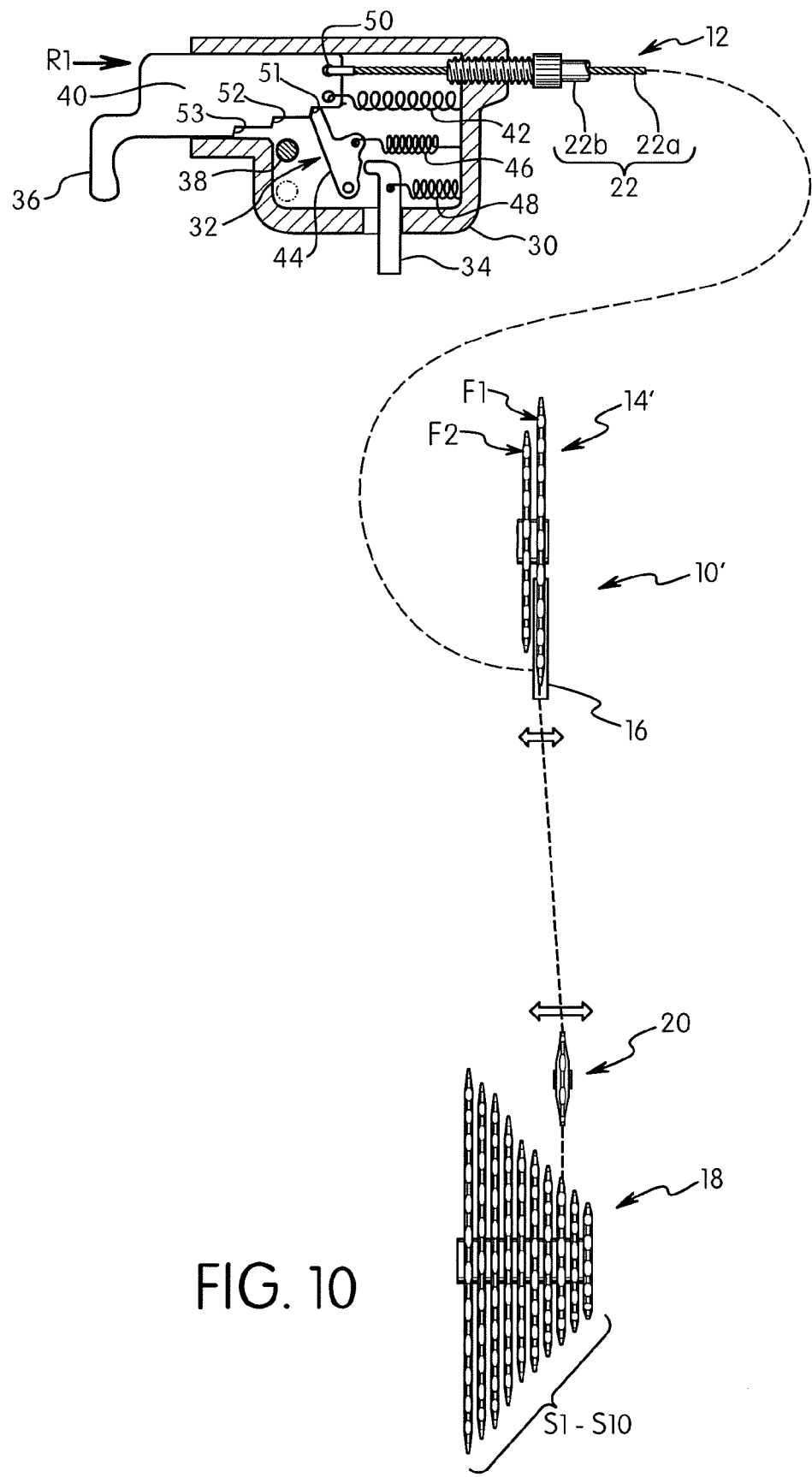
FIG. 10 is a schematic illustration of a portion of a bicycle drive train with two front sprockets and a front derailleur that is shifted by the bicycle shift control device illustrated in FIGS. 1 to 8.

Turning briefly to FIG. 10, a drive train 10' with a two-sprocket front gear set 14' is illustrated that can be used with the bicycle shift control device 12 when the bicycle shift control device 12 is set to the shift restricting position (see FIGS. 7 to 9). In view of the similarity between the drive trains 10 and 10', the parts of the drive trains 10 and 110 that are identical will be given the same reference numerals. Moreover, the descriptions of the parts of the drive train 10' will be omitted for the sake of brevity.

Basically, the bicycle shift control device 12 is operatively connected to the front derailleur 16 by a control cable 22 (e.g., a Bowden cable) having an inner wire 22a and an outer casing 22b. Operation of the bicycle shift control device 12 shifts the front derailleur 16 laterally with respect to a longitudinal plane of the bicycle drive train 10 so as to selectively align with one of the front sprockets F1, F2 and F3. While the bicycle shift control device 12 is illustrated as being used with to shift the front derailleur 16 between three gear positions, it will be apparent to those skilled in the art from this disclosure that the bicycle shift control device 12 can be modified to have more shift positions and that the number of shift positions that are locked out can be more than one shift position.

As best seen in FIGS. 2 to 9, the bicycle shift control device 12 basically includes a shifter housing 30, a gear shifting mechanism 32, a first shift operating member 34, a second shift operating member 36 and a restricting member or pin 38. The restricting member 38 constitutes a shift switching arrangement that selectively restricts operation of the gear shifting mechanism 32 as discussed below. The shifter housing 30 is a rigid member constructed of a suitable material such as rigid plastic and/or metal. The shifter housing 30 houses the gear shifting mechanism 32, with the first and second operating members 34 and 36 having rider (user) actuating portions extending out of the shifter housing 30. The shifter housing 30 has a handlebar clamp 30a for attaching to a handlebar.

In this first illustrated embodiment, the gear shifting mechanism 32 is arranged with respect to the restricting member 38 to move in a first set of operating positions (e.g. three operating positions—the first operating position, the intermediate operating position and the last operating position) when the restricting member 38 is in the non-shift restricting position as seen in FIGS. 2 to 6. Also in this first illustrated embodiment, the gear shifting mechanism 32 is arranged with respect to the restricting member 38 to move in a second set of operating positions (e.g. two operating positions—the first operating position and the intermediate operating position) as seen in FIGS. 7 to 9 that is different from the first set of operating positions when the restricting member 38 is in the non-shift restricting position as seen in FIGS. 2 to 6. In this first illustrated embodiment, the second set of operating positions has a fewer number (at least one less) of the operating positions than those of the first set of operating positions.

In this first illustrated embodiment, the gear shifting mechanism 32 is a mechanical arrangement that basically includes a wire takeup member 40, a first biasing element 42, a positioning member or pawl 44 and a second biasing element 46. As mention above, the gear shifting mechanism 32 is disposed in the shifter housing 30. The gear shifting mechanism 32 has a plurality of operating positions (i.e., three operating positions in this embodiment).

In this first illustrated embodiment, the wire takeup member 40 is slidably disposed within the shifter housing 30. On end of the inner wire 22a is connected to the wire takeup member 40, with the adjacent end of the outer casing 22b contacting an adjuster of the shifter housing 30. More specifically, the wire takeup member 40 has a control wire connection structure 50, a first abutment 51 forming a top gear position, a second abutment 52 forming a middle gear position and a third abutment 53 forming a bottom gear position. The inner wire 22a is connected to the control wire connection structure 50 such that movement of the wire takeup member 40 with respect to the shifter housing 30 causes the inner wire 22a to be released by movement of the first shift operating member 34 or pulled by movement of the second shift operating member 36. In this first illustrated embodiment, the first shift operating member 34 is pivotally mounted to the shifter housing 30, while the second shift operating member 36 is integrally formed with the wire takeup member 40. Preferably, the first shift operating member 34 is a trigger type operating member with a biasing element 48 urging the first shift operating member 34 to a rest position.

The abutments 51 to 53 constitute a plurality of positioning teeth. In the first illustrated embodiment, the positioning teeth or abutments 51 to 53 are integrally formed with a body of the wire takeup member 40 to move with the wire takeup member 40 as a unit. Alternatively, the abutments 51 to 53 can be a separate element that is fixedly attached to the wire takeup member 40. The first abutment 51 can be considered to constitute a first operating position of the plurality of operating positions. The second abutment 52 can be considered to constitute an intermediate operating position of the plurality of operating positions. The third abutment 53 can be considered to constitute a last operating position of the plurality of operating positions. Accordingly, the positioning member or pawl 44 contacts the abutments 51 to 53 to attain the plurality of operating positions by preventing the wire takeup member 40 from moving with respect to the shifter housing 30 in a wire release direction R1 when the positioning pawl 44 is engaged with one of the positioning teeth or abutments 51 to 53.

The first biasing element 42 is operatively connected between the shifter housing 30 and the wire takeup member 40 to bias the wire takeup member 40 to a wire release direction. In this first illustrated embodiment, the first biasing element 42 is illustrated as a coil tension spring. However, it will be apparent to those skilled in the art from this disclosure that other types of biasing elements can be used as needed and/or desired.

In this first illustrated embodiment, the positioning pawl 44 is movably (pivotally) arranged on the shifter housing 30 to selectively engage the positioning teeth or abutments 51 to 53. Accordingly, the positioning pawl 44 engages the positioning teeth or abutments 51 to 53 to attain the plurality of operating positions by preventing the wire takeup member 40 from moving with respect to the shifter housing 30 in the wire release direction R1 when the positioning pawl 44 is engaged with one of the positioning teeth or abutments 51 to 53. The restricting member 38 restricts movement of the positioning pawl 44 such that the positioning pawl 44 cannot move out of engagement from the positioning tooth or abutment 52 to prohibit the gear shifting mechanism 32 from moving from the currently engaged operating position when the restricting member 38 is in the shift restricting position.

The second biasing element 46 is operatively connected between the positioning pawl 44 and the shifter housing 30 to bias the positioning pawl 44 to an engagement position with one of the abutments 51, 52 and 53 of the wire takeup member 40 for selectively holding the wire takeup member 40 in one of the plurality of operating positions. In this first illustrated embodiment, the second biasing element 46 is illustrated as a coil tension spring. However, it will be apparent to those skilled in the art from this disclosure that other types of biasing elements can be used as needed and/or desired.

In this first illustrated embodiment, the first shift operating member 34 is operatively connected to the gear shifting mechanism 32 to perform a wire release operation. The first shift operating member 34 is movable with respect to the shifter housing 30 to operate the gear shifting mechanism 32. More specifically, the first shift operating member 34 is slidably arranged with respect to the shifter housing 30 for movement between a rest position (FIGS. 1, 2, 4, 6, 7 and 9) and an actuating (wire release) position (FIGS. 3, 5 and 8).

The restricting member or pin 38 is arranged to selectively restrict operation of the gear shifting mechanism 32 such that the number of operating positions can be limited. Thus, for example, the restricting member 38 allows the bicycle shift control device 12 to be used with different bicycle drive trains. In particular, the bicycle shift control device 12 to be used to shift either a three-front sprocket gear set such as the drive train 10 (FIG. 1) or a two-front sprocket gear set such as the drive train 10' (FIG. 10). For example, in this first illustrated embodiment, the bicycle shift control device 12 can be used to with either a bicycle drive train that has three front sprockets or a bicycle drive train that only has two front sprockets. Of course, the bicycle shift control device 12 can be used with a single bicycle drive train to lockout one or more of the sprockets.

In this first illustrated embodiment, the restricting member 38 is a movably mounted with respect to the shifter housing 30 between the non-shift restricting position (FIGS. 1 to 6) and the shift restricting position (FIGS. 7 to 9). As seen in FIG. 1, the restricting member 38 includes a user operable part 38a and a blocking part 38b. The user operable part 38a is accessible through the shifter housing 30 without disassembling the bicycle shift control device 12. Thus, the restricting member 38 can be easily switched between the non-shift restricting position (FIGS. 1 to 6) in which all possible shift (gear) operating positions of the gear shifting mechanism 32 are accessible and the shift restricting position (FIGS. 7 to 9) in which at least one possible shift (gear) operating positions of the gear shifting mechanism 32 is inaccessible.

While the bicycle shift control device 12 is illustrated as a three gear shifter for the front derailleur 16. The shift switching arrangement (e.g., the restricting member 38) can be used in a bicycle shift control device (not shown) for the rear derailleur 20. In any event, the gear shifting mechanism 32 includes at least a first operating position and a last operating position, with the restricting member 38 reducing the number of shift operating positions that can be achieved by preventing the gear shifting mechanism 32 from being shifted to at least one of the end (i.e., the first or last) operating position when the restricting member 38 is in the shift restricting position.

Second Embodiment

Referring now to FIGS. 11 to 23, a bicycle shift control device 212 in accordance with a second embodiment will now be explained. The bicycle shift control device 212 utilizes the same principles as the bicycle shift control device 12 to allow a rider (user) to selectively regulate the bicycle shift control device 12 between two different sets of the operating positions. The bicycle shift control device 212 can be used with the drive trains 10 and 10'. Basically, the bicycle shift control device 212 is operatively connected to the front derailleur 16 by the control cable 22 in the same manner as the first embodiment.

Figure 11:
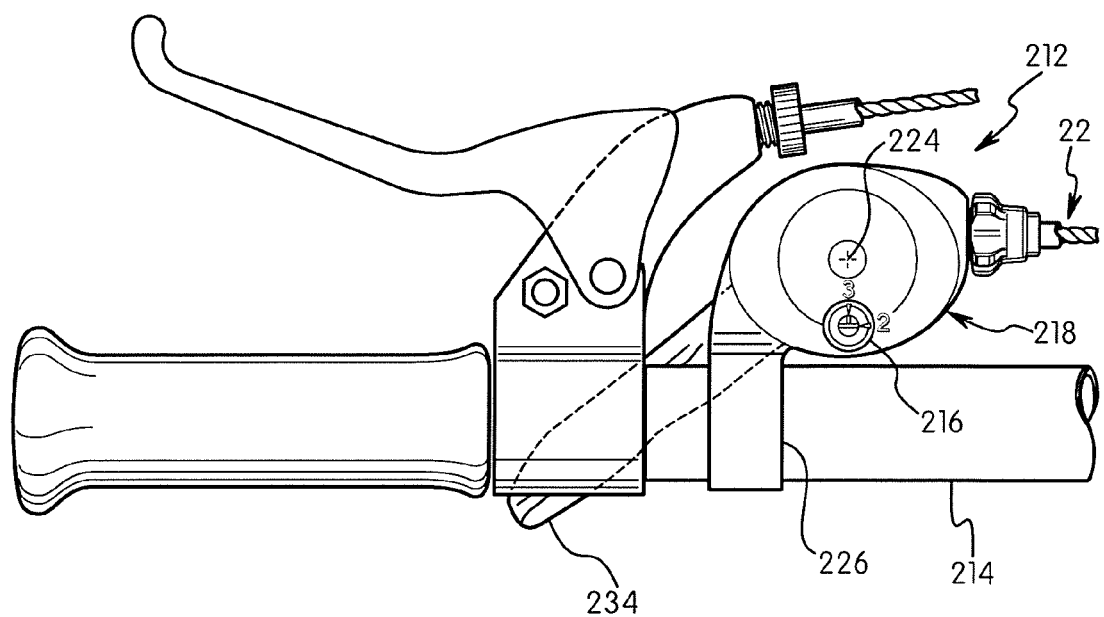
FIG. 11 is a top plan view of a bicycle handlebar with a bicycle shift control device in accordance with a second embodiment.

As seen in FIG. 11, the bicycle shift control device 212 is configured to be mounted to a bicycle handlebar 214 in a conventional manner. In this second illustrated embodiment, the bicycle shift control device 212 is provided with a restricting member or pin 216 rotatably mounted with respect to a shifter housing 218 to switch the restricting member 216 between the non-shift restricting position and the shift restricting position by rotating the restricting member 216 ninety degrees. The restricting member 216 constitutes a shift switching arrangement that selectively restricts the gear shifting operation as discussed below.

Figure 12:
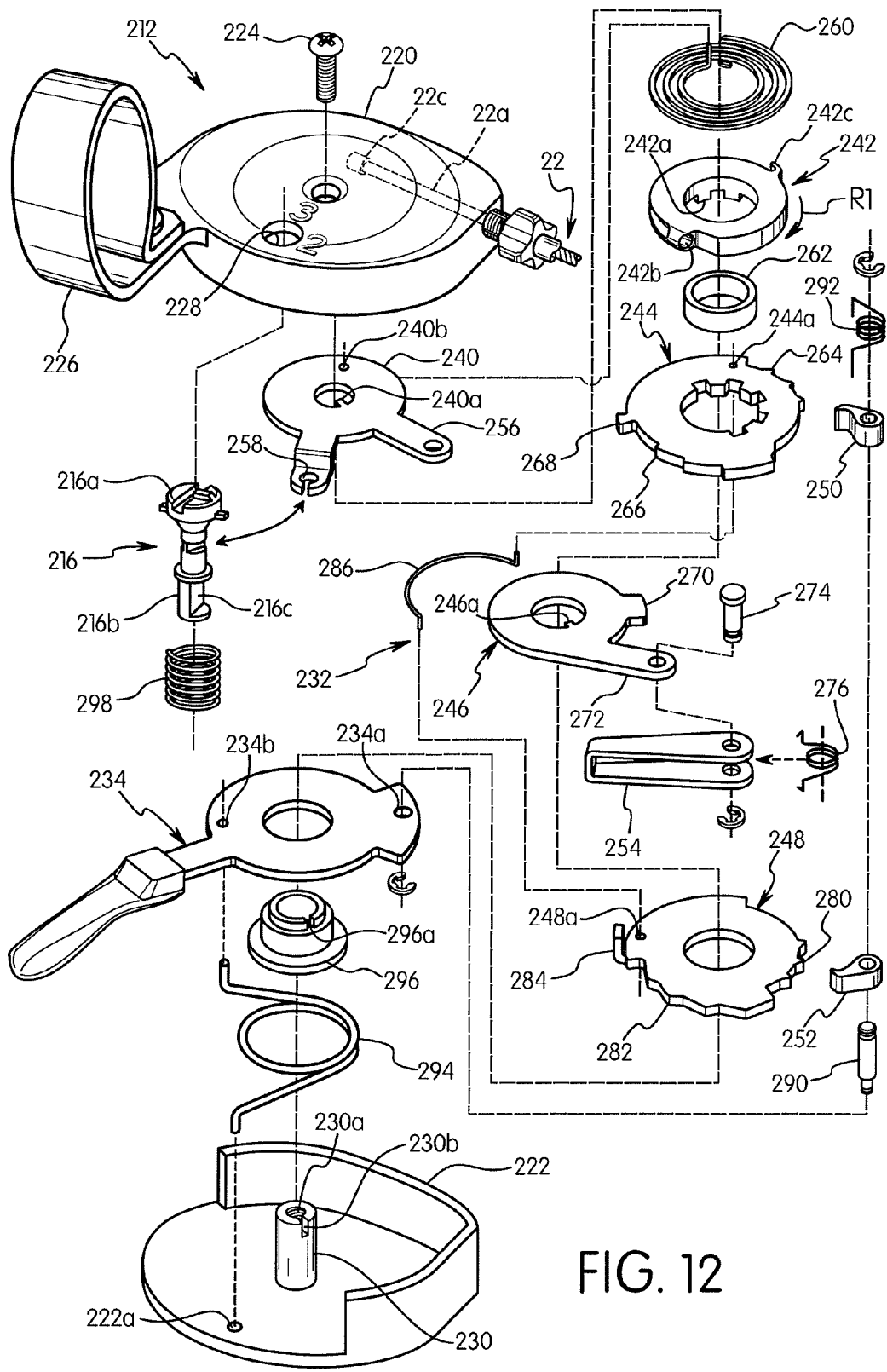
FIG. 12 is an exploded perspective view of the bicycle shift control device illustrated in FIG. 11, illustrating principal parts of the bicycle shift control device.

As seen in FIG. 12, the shifter housing 218 of the bicycle shift control device 212 has an upper cover part 220 and a lower cover part 222 that are connected by a fastener 224. The cover parts 220 and 222 of the shifter housing 218 are rigid members constructed of a suitable material such as rigid plastic and/or metal. The upper cover part 220 has a handlebar clamp 226 for attaching the shifter housing 218 to the handlebar 214 in a conventional manner. The upper cover part 220 also has an opening 228 for operating (rotating) the restricting member 216 between the non-shift restricting position in which all possible shift (gear) operating positions of the gear shifting mechanism 232 are accessible and the shift restricting position in which at least one possible shift (gear) operating positions of the gear shifting mechanism 232 is inaccessible. The lower cover part 222 is provided with a mounting post 230 that has a center threaded bore 230a for threadedly receiving the fastener 224. The shifter housing 218 houses a gear shifting mechanism 232 and a single shift operating member 234. In particular, the cover parts 220 and 222 of the shifter housing 218 houses the gear shifting mechanism 232, with a rider (user) actuating portion of the operating member 234 extending out of the shifter housing 218. The mounting post 230 has a center axis that defines a pivot axis of the gear shifting mechanism 232 and the operating member 234.

Still referring to FIG. 12, the gear shifting mechanism 232 mainly includes a first stationary plate or member 240, a wire takeup member 242, a winding plate or member 244, a second stationary plate or member 246, a release plate or member 248, a one-way winding pawl 250, a one-way release pawl 252, and a one-way positioning pawl 254.

In the illustrated embodiment, the first stationary plate 240 is non-rotatably mounted to the mounting post 230 of the lower cover part 222. In particular, a notch 240a engages a notch 230b of the mounting post 230 of the lower cover part 222. The first stationary plate 240 rotatably supports the restricting member 216 between the cover parts 220 and 222 of the shifter housing 218. Thus, the first stationary plate 240 is a hard, rigid member made of a suitable material, such as a metal material. Preferably, the first stationary plate 240 is provided with a fixing arm 256 and a restricting pin support 258. The fixing arm 256 aids in supporting the positioning pawl 254 as explained below. The restricting pin support 258 rotatably supports the restricting member 216.

The wire takeup member 242 is rotatably supported on the mounting post 230 of the lower cover part 222. The wire takeup member 242 has a plurality of protrusions 242a, an inner wire attachment structure 242b and a spring attachment structure 242c. The protrusions 242a extend down from the wire takeup member 242 to engage the winding plate 244 so that the wire takeup member 242 and the winding plate 244 move together as a single unit. A nipple 22c on one end of the inner wire 22a is attached to the inner wire attachment structure 242b of the wire takeup member 242 so that rotation of the wire takeup member 242 results in the inner wire 22a being pulled or released depending on the direction of rotation of the wire takeup member 242.

A biasing element or spring 260 is operatively connected between the first stationary plate 240 and the wire takeup member 242 for applying an urging force that biases the wire takeup member 242 in a wire release direction R1. The spring 260 is a torsion spring with a first end disposed in a hole 240b of the first stationary plate 240, and a second end hooked on the spring attachment structure 242c.

A metal washer 262 is disposed between the wire takeup member 242 and the mounting post 230 of the lower cover part 222. The metal washer 262 extends through the center openings of the wire takeup member 242 and the winding plate 244 so as to contact a bottom surface of the first stationary plate 240 and a top surface of the second stationary plate 246. Thus, the metal washer 262 maintains the proper axial spacing between the first and second stationary plates 240 and 246 to ensure that the wire takeup member 242 and the spring 260 are not squeezed between.

In the illustrated embodiment, the winding plate 244 is a flat plate with a peripheral edge that includes three winding teeth 264, three positioning teeth 266 and a stop 268. Preferably, the winding plate 244 is a hard, rigid member made of a suitable material such as a metal material. The wire takeup member 242 is rotatable with the winding plate 244 and retained in stagewise stopping positions by the positioning pawl 254 engaging the winding plate 244. The winding teeth 264 are arranged to operatively engage the winding pawl 250 after the rider (user) pivots the operating member 234 in a winding direction (i.e., opposite the release direction R1). In particular, once the rider (user) pivots the operating member 234 by a small amount in the winding direction, the winding pawl 250 engages one of the winding teeth 264 such that further pivotal movement of the operating member 234 rotates the wire takeup member 242 and the winding plate 244 as a unit in the winding direction. When the operating member 234 is in a rest position (e.g., see FIGS. 14 and 16), the positioning pawl 254 is engaged with one of the positioning teeth 266 to maintain the wire takeup member 242 and the winding plate 244 in a current shift position against the biasing force of the spring 260. The positioning teeth 266 and the positioning pawl 254 have an engaging structure and positional relationship to allow rotation in the wire winding direction of the wire takeup member 242 by operation of the operating member 234, and to prevent backward rotation in the release direction R1 of the wire takeup member 242.

The three positioning teeth 266 have abutment surfaces 266a, 266b and 266c, respectively. The positioning teeth 266 are step-shaped teeth in which the outermost points of the abutment surfaces 266a, 266b and 266c of the positioning teeth 266 get farther from the center axis of the winding plate 244 in the release direction R1. In other words, the abutment surface 266a of the positioning tooth of the positioning teeth 266 that corresponds to the fully wound position has its outermost point closest to the center axis of the winding plate 244. The abutment surface 266c of the positioning tooth of the positioning teeth 266 that corresponds to the fully released position has its outermost point farthest from the center axis of the winding plate 244. The abutment surface 266b of the middle positioning tooth of the positioning teeth 266 has its outermost point between the abutment surfaces 266a and 266c of the other two of the positioning teeth 266 with respect to the center axis of the winding plate 244. The stop 268 of the winding plate 244 engages the release plate 248 to limit rotation of the release plate 248 in the winding direction (i.e., opposite the release direction R1) with respect to the winding plate 244.

Figure 20:
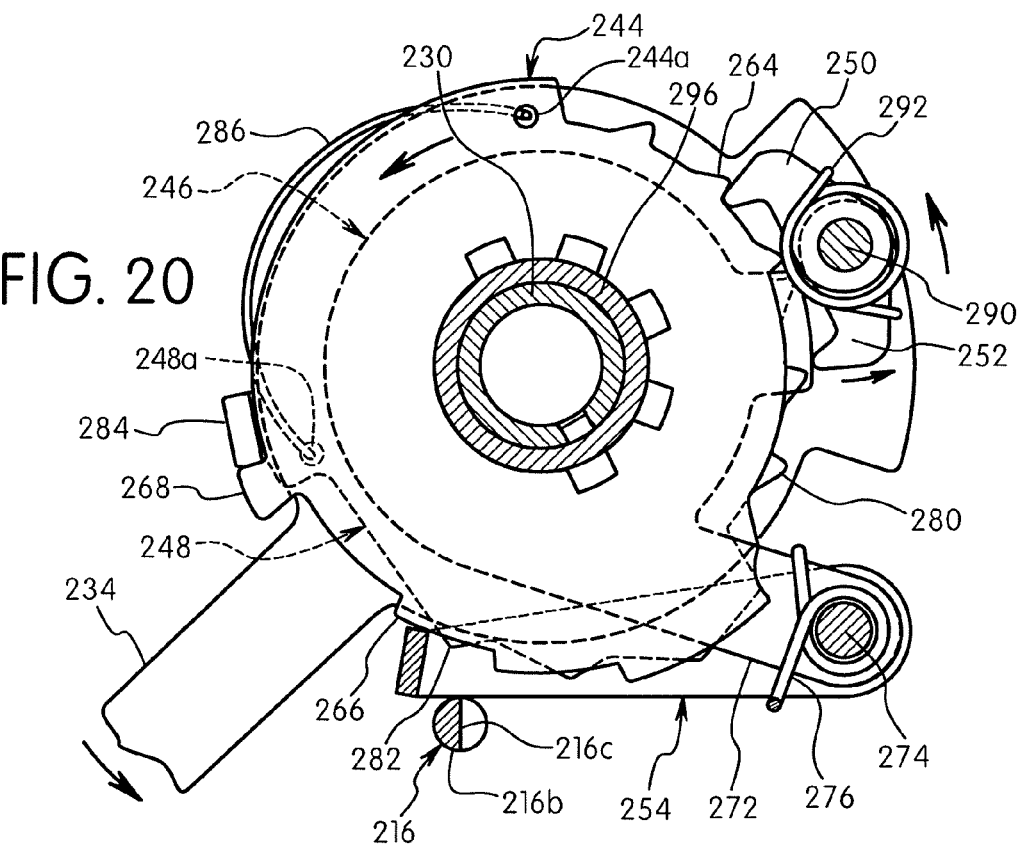
FIG. 20 is a top schematic view of selected parts the bicycle shift control device illustrated in FIGS. 11 to 16 illustrating a wire winding operation.
Figure 21:
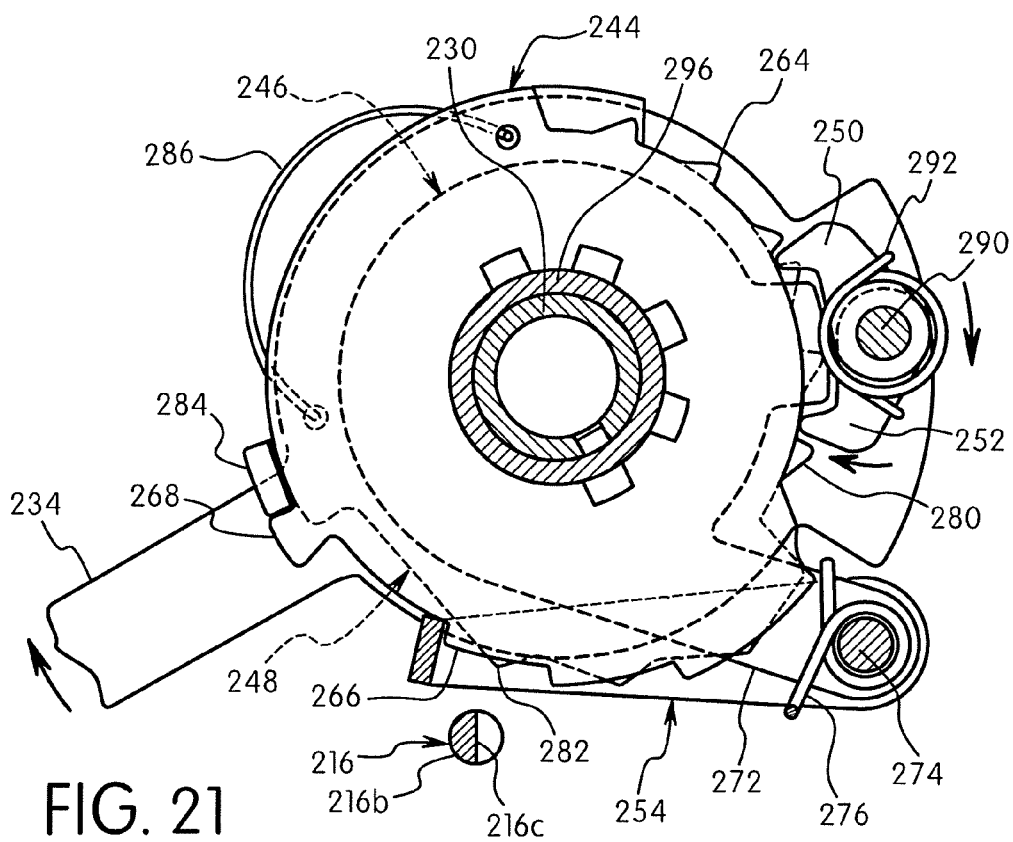
FIG. 21 is a top schematic view of selected parts the bicycle shift control device illustrated in FIGS. 11 to 16 illustrating a rest position after the wire winding operation illustrated in FIG. 20.
Figure 22:
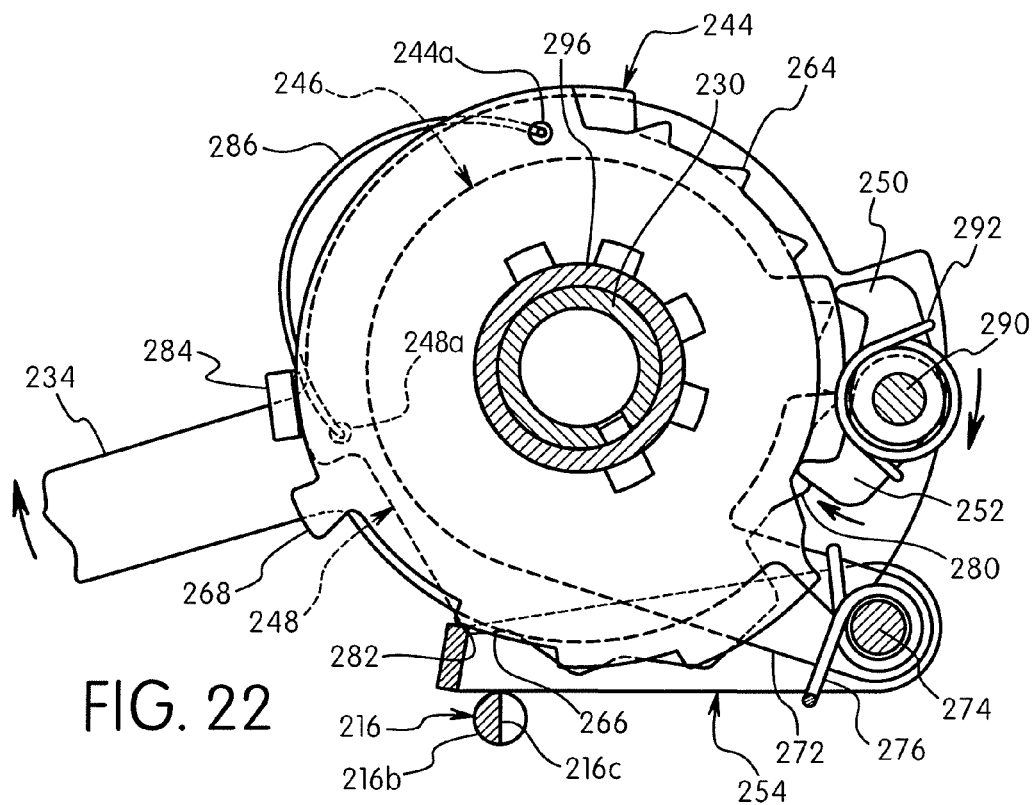
FIG. 22 is a top schematic view of selected parts the bicycle shift control device illustrated in FIGS. 11 to 16 illustrating a wire release operation.
Figure 23:
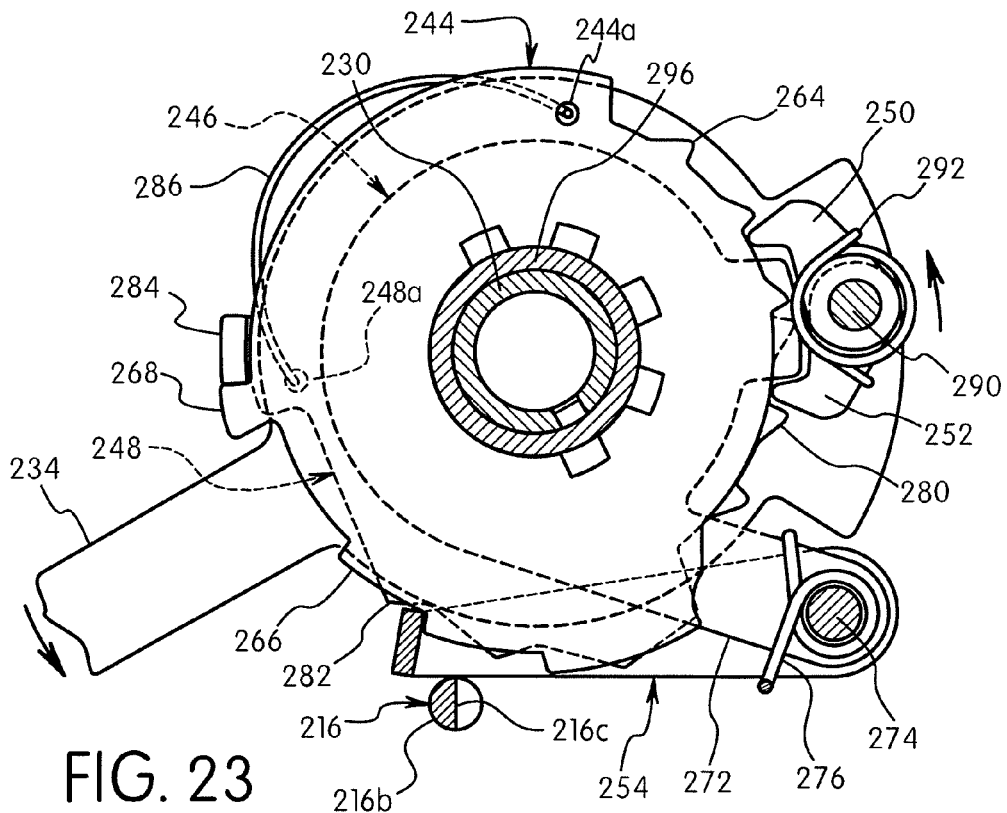
FIG. 23 is a top schematic view of selected parts the bicycle shift control device illustrated in FIGS. 11 to 16 illustrating a rest position after the wire release operation illustrated in FIG. 22.

In the illustrated embodiment, the second stationary plate 246 includes a guide 270 and a fixing arm 272. The second stationary plate 246 is a hard, rigid member made of a suitable material, such as a metal material. The guide 270 is disposed between the pawls 250 and 252 when the operating member 234 is in the rest position (e.g., see FIGS. 14 and 16). The guide 270 is arranged to hold the winding pawl 250 radially outward from the winding plate 244 in a disengaged position, when the operating member 234 is moved from the rest position (e.g., see FIGS. 14 and 16) to the winding position (FIG. 20). The guide 270 is further arranged to hold the release pawl 254 radially outward from the release plate 248 in a disengaged position, when the operating member 234 is moved from the rest position (e.g., see FIGS. 14 and 16) to the releasing position (FIG. 22).

The second stationary plate 246 is non-rotatably mounted to the first stationary plate 240, and thus, non-rotatably mounted to the shifter housing 218. In particular, the fixing arm 272 of the second stationary plate 246 is coupled to the first stationary plate 240 by a pivot pin 274. This pivot pin 274 pivotally supports the positioning pawl 254, which is biased by a biasing element or spring 276 to selectively engage the positioning teeth 266.

In the illustrated embodiment, the release plate 248 is a flat plate with a peripheral edge that includes three release teeth 280, three release cams 282 and a stop flange 284. Preferably, the release plate 248 is a hard, rigid member made of a suitable material such as a metal material. The release teeth 280 are arranged to operatively engage the release pawl 252 after the rider (user) pivots the operating member 234 in the release direction R1. In particular, once the rider (user) pivots the operating member 234 by a small amount in the release direction R1, the release pawl 252 engages one of the release teeth 280 such that further pivotal movement of the operating member 234 rotates the release plate 248 in the release direction R1. This movement of the release plate 248 causes the release cams 282 of the release plate 248 to pivot the positioning pawl 254 against the force of the spring 276. In other words, when the release member 248 is rotated in the release direction R1, the release cams 282 forcibly swing the positioning pawl 254 out of engagement with the positioning teeth 266. This movement of the positioning pawl 254 by the release cams 282 causes the positioning pawl 254 to release the positioning teeth 266. Since the wire takeup member 242 and the winding plate 244 are biased in the release direction R1 by the biasing force of the spring 260, the wire takeup member 242 and the winding plate 244 will rotate in the release direction R1 once the positioning pawl 254 is moved radially outward by the positioning teeth 266. In other words, the wire takeup member 242 freed by this disengagement rotates in the release direction R1 under the force of the spring 260. As mentioned above, the positioning teeth 266 are step-shaped teeth, and thus, rotation of the operating member 234 in the release direction R1 results in the positioning pawl 254 engaging the next adjacent one of the positioning teeth 266 in the winding direction (i.e., opposite the release direction R1).

The positioning teeth 266 and release cams 282 have radially outwardly increasing heights in the release direction R1, respectively, and in which each release cams 282 is higher than the next tooth of the positioning teeth 266 engaged prior to a wire release operation and lower than a next tooth of the positioning teeth 266 in the release direction R1. Consequently, the rotation in the unwinding direction of the wire takeup member 242 resulting from one unwinding operation is limited to one pitch of the positioning teeth 266.

Figure 14:
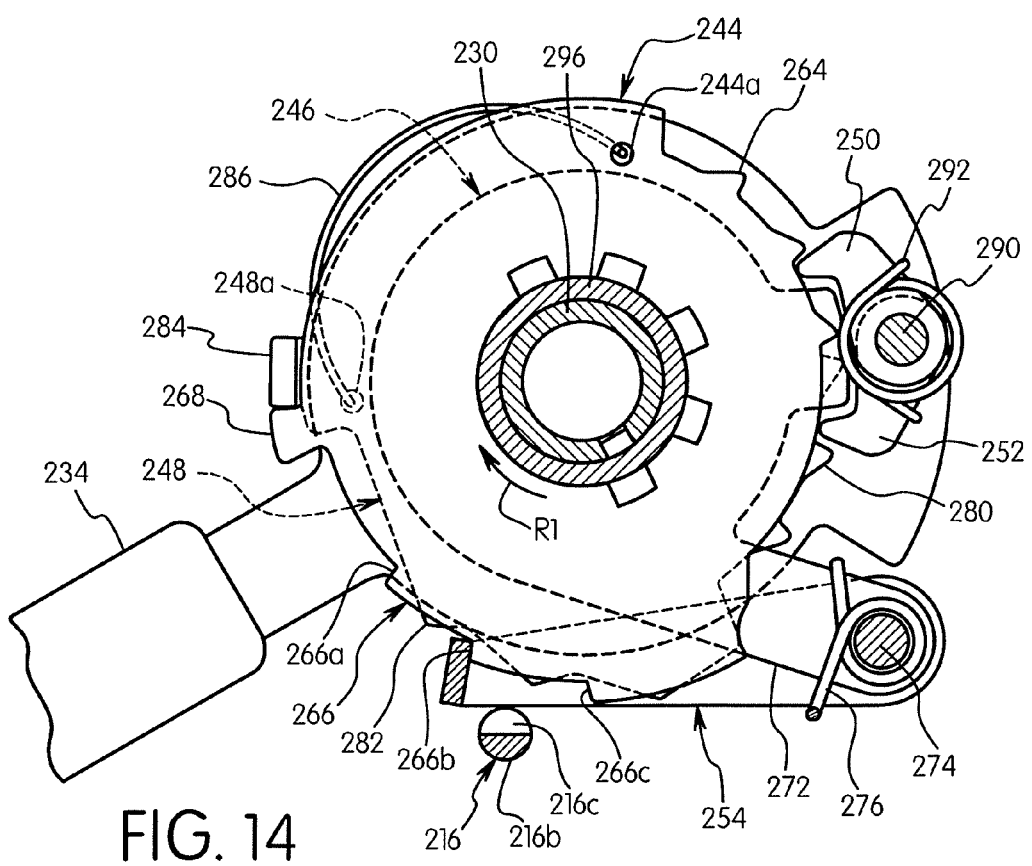
FIG. 14 is a top schematic view of selected parts the bicycle shift control device illustrated in FIGS. 11 to 13 with the shift switching arrangement in the non-shift restricting position.
Figure 16:
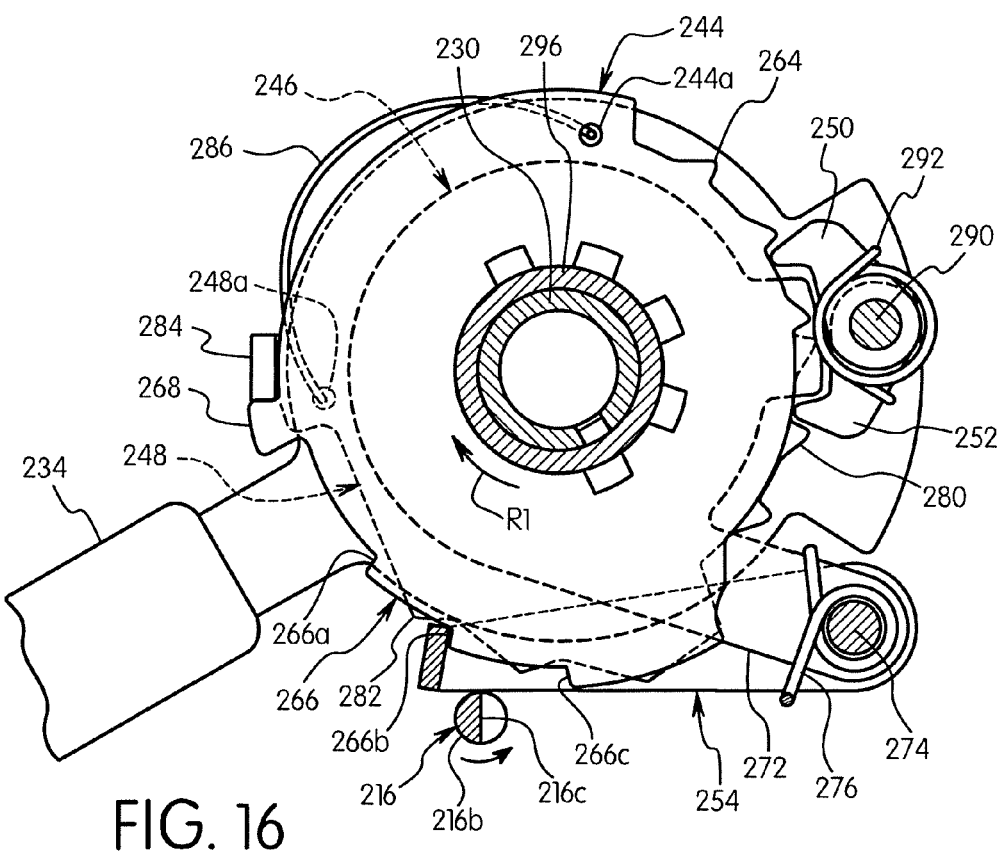
FIG. 16 is a top schematic view of selected parts the bicycle shift control device illustrated in FIGS. 11 to 15 with the shift switching arrangement in the shift restricting position.
Figure 17:
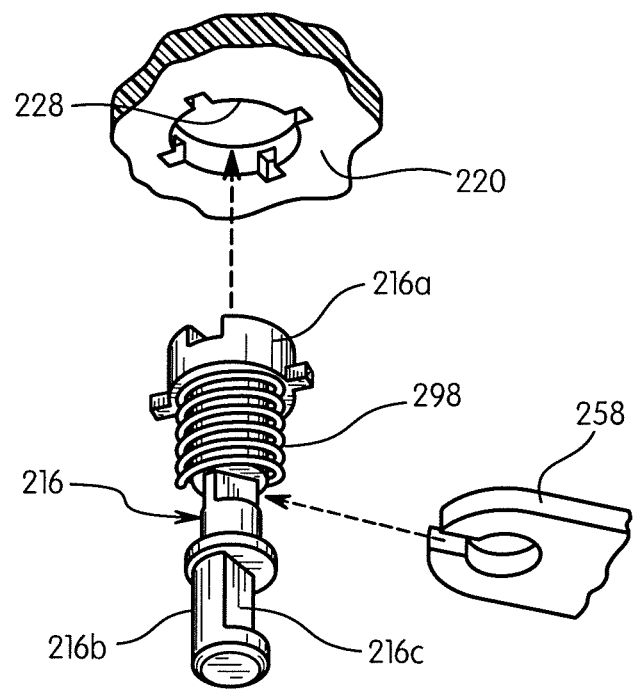
FIG. 17 is an exploded perspective view of the shift switching arrangement for the bicycle shift control device illustrated in FIGS. 11 to 16.
Figure 18:
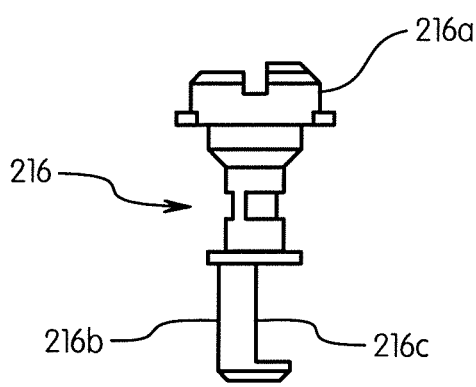
FIG. 18 is an elevational view of the restricting member of the shift switching arrangement illustrated in FIG. 17.
Figure 19:
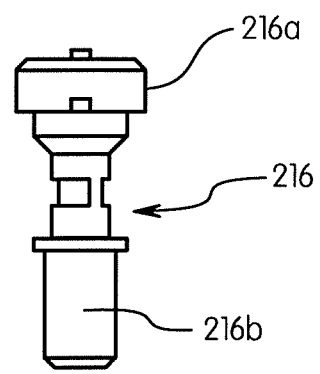
FIG. 19 is another elevational view of the restricting member of the shift switching arrangement illustrated in FIGS. 17 and 18.

A biasing element or spring 286 is operatively connected between the winding plate 244 and the release plate 248 such that the stop flange 284 of the release plate 248 is urged against the stop 268 of the winding plate 244 when the operating member 234 is in the rest position (e.g., see FIGS. 14 and 16) and when a winding operation is performed (FIG. 20). As seen in FIGS. 14 and 16, the spring 286 has a first end located in a hole 244a of the winding plate 244 and a second end located in a hole 248a of the release plate 248.

The winding pawl 250 and the release pawl 252 are pivotally mounted on a pivot pin 290. The pivot pin 290 is fixed in hole 234a of the operating member 234. Thus, the winding pawl 250 and the release pawl 252 move with the operating member 234 as the operating member 234 is pivoted with respect to the shifter housing 218. A biasing element or spring 292 is mounted on the pivot pin 290. The spring 292 biases the winding pawl 250 and the release pawl 252 into opposite directions about the longitudinal axis of the pivot pin 290. In other words, the winding pawl 250 and the release pawl 252 are urged toward engagement positions by the spring 292. Thus, when the operating member 234 is in the rest position (e.g., see FIGS. 14 and 16), the spring 292 biases the winding pawl 250 into contact with the winding plate 244, and biases the release pawl 252 into contact with the release plate 248.

The operating member 234 is an elongated lever member that is pivotally mounted to the shifter housing 218. The operating member 234 is a trigger type lever in both the release direction R1 and the winding direction (i.e., opposite the release direction R1). Shifting gears in the wire winding direction or positive direction is affected by moving the operating member 234 from the rest position to a first shift end in the winding direction (i.e., opposite the release direction R1). Shifting gears in the release direction R1 or negative direction is affected by moving the operating member 234 from the rest position to a second shift end in the release direction R1.

The operating member 234 is operatively connected to the wire takeup member 242 of the gear shifting mechanism 232 to rotate the wire takeup member 232 in the wire releasing direction R1 in response to movement of the operating member 234 from the rest position in a first rotational direction and to rotate the wire takeup member 242 in the wire winding direction (i.e., opposite the release direction R1) in response to movement of the operating member 234 from the rest position in a second rotational direction that is opposite the first rotational direction.

A return biasing element or spring 294 is operatively connected between the lower cover 222 and the operating member 234 to urge the operating member 234 to the rest position (e.g., see FIGS. 14 and 16). In particular, the return spring 294 has a first end disposed in a hole 222a in the lower cover 222 and a second end disposed in a hole 234b in the operating member 234. A bushing 296 is provided on the mounting post 230 for pivotally supporting the operating member 234. The bushing 296 is disposed within the coiled portion of the return spring 294 to maintain the proper axial spacing for preventing the return spring 294 from being squeezed between the lower cover 222 and the operating member 234. The bushing 296 has a notch 296a that engages a tab or projection 246a of the second stationary plate 246 to prevent relative rotation of the bushing 296 with respect to the shifter housing 218.

Figure 15:
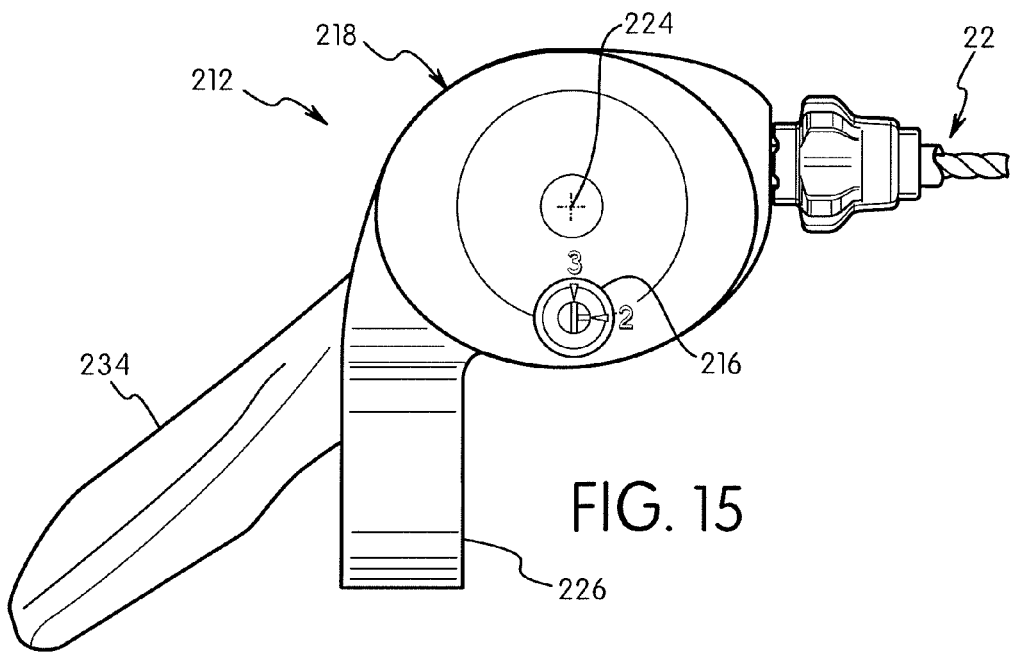
FIG. 15 is a top plan view of the bicycle shift control device illustrated in FIGS. 11 to 14 with the shift switching arrangement in a shift restricting position.

As best seen in FIGS. 12 and 17 to 19, the restricting member 216 is preferably a one-piece, unitary member that includes a user operable part 216a, and a blocking part or control shaft 216b with a cutout 216c. The restricting member 216 is preferably constructed of a hard rigid material such as a metal or hard plastic material. The user operable part 216a is accessible through the opening 228 in the shifter housing 218 without disassembling the bicycle shift control device 212. In this second illustrated embodiment, the restricting member 216 is a rotatably mounted with respect to the shifter housing 218 between the non-shift restricting position (FIGS. 13 and 14) and the shift restricting position (FIGS. 15 and 16). In particular, the control shaft 216b is rotated by turning the user operable part 216a about the pivot axis of the control shaft 216b about ninety degrees when switching between the non-shift restricting position and the shift restricting position. Thus, in this second illustrated embodiment, the restricting member 38 is movable between the non-shift restricting position (FIGS. 13 and 14) and the shift restricting position (FIGS. 15 and 16) such that the gear shifting mechanism 232 can be shifted between a first set of operating positions (i.e., three operating positions) as seen in FIGS. 13 and 14 and a second set of operating positions (i.e., only two operating positions) as seen in FIGS. 15 and 16.

In the illustrated embodiment, the shift switching arrangement includes the restricting member 216 and a spring 298 that is disposed between a downward facing surface of the upper cover part 220 and the restricting pin support 258 of the first stationary plate 240. The spring 298 urges the control shaft 216b against the upper cover part 220 of the shifter housing 218 to selectively retain the control shaft 216b in one of the non-shift restricting position and the shift restricting position. The spring 298 is configured and arranged to hold the user operable part 216a against an interior surface of the upper cover part 220 of the shifter housing 218 with the user operable part 216a disposed in the opening 228 in the upper cover part 220 of the shifter housing 218. Preferably, the spring 298 is a coiled compression spring that is coaxially mounted on the upper portion of the control shaft 216b. Thus, to switch between the non-shift restricting position and the shift restricting position, the user or rider pushes the control shaft 216b in an axial direction against the urging force of the spring 298 so that the control shaft 216b can then be rotated.

Figure 13:
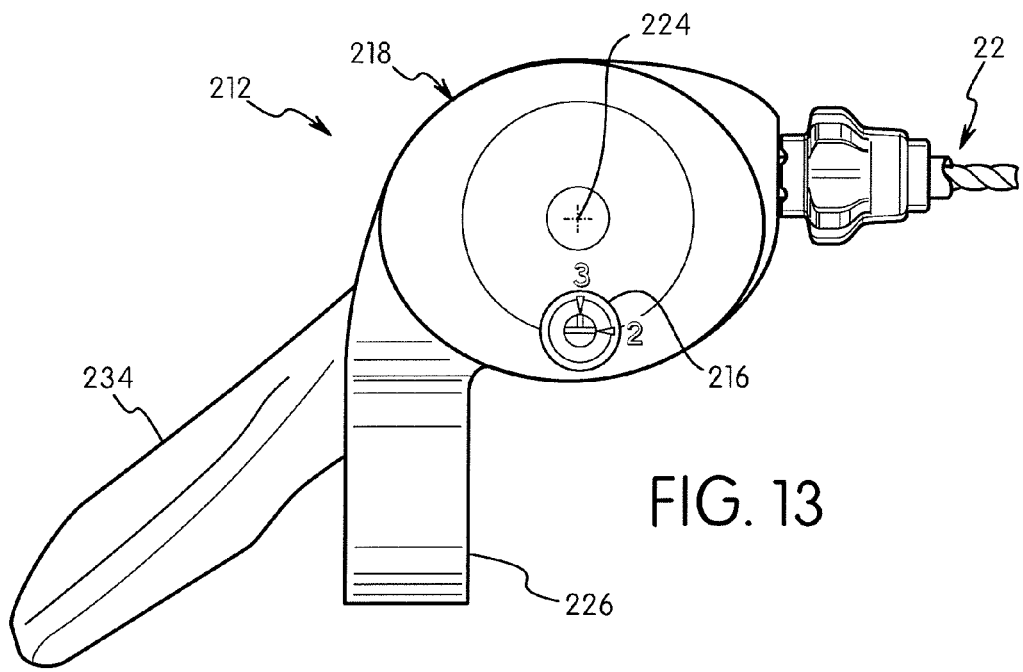
FIG. 13 is a top plan view of the bicycle shift control device illustrated in FIGS. 11 and 12 with a shift switching arrangement in a non-shift restricting position.

Referring to FIGS. 13 and 14, the control shaft 216b is movably mounted such that when the cutout 216c of the control shaft 216b is positioned within a movement path of the positioning pawl 254, the positioning pawl 254 is permitted to move through its complete range of movement so that all shift positions are operable. In other words, the restricting member 216 is in the non-shift restricting position when the cutout 216c of the control shaft 216b is positioned within the movement path of the positioning pawl 254. Thus, the positioning pawl 254 can move radially outward with respect to the center axis of the winding plate 244 to disengage from the abutment 266b of the middle positioning tooth of the positioning teeth 266 and then engage the abutment 266c of the positioning tooth of the positioning teeth 266 that corresponds to the last gear position, when the restricting member 216 is in the non-shift restricting position.

On the other hand, as seen in FIGS. 15 and 16, the control shaft 216b blocks movement of the positioning pawl 254 out of engagement from the abutment 266b of the middle positioning tooth of the positioning teeth 266 to prohibit the positioning pawl 254 from engaging the abutment 266c of the positioning tooth of the positioning teeth 266 that corresponds to the last gear position when the restricting member 216 is in the shift restricting position. In other words, the restricting member 216 is in the shift restricting position when the control shaft 216b is positioned within the movement path of the positioning pawl 254 to block or limit the full range of movement of the positioning pawl 254 such that the last gear position cannot be attained (i.e., the last gear position is inoperable).

While the bicycle shift control device 212 is illustrated as a three gear shifter for the front derailleur 16. The shift switching arrangement (e.g., the restricting member 216) can be used in a bicycle shift control device (not shown) for the rear derailleur 20. In any event, the gear shifting mechanism 232 includes at least a first operating position and a last operating position, with the restricting member 216 reducing the number of shift operating positions that can be achieved by preventing the gear shifting mechanism 232 from being shifted to at least one of the end (i.e., the first or last) operating position when the restricting member 216 is in the shift restricting position.

Third Embodiment

Referring now to FIGS. 24 to 27, a bicycle shift control device 212' in accordance with a third embodiment will now be explained. The bicycle shift control device 212' is identical to the bicycle shift control device 212, except that the position of the restricting member 216 has been changed and the winding plate 244 has been replaced with a modified winding plate 244' in this third embodiment. The bicycle shift control device 212' can be used with the drive trains 10 and 10'. Basically, the bicycle shift control device 212' is operatively connected to the front derailleur 16 by the control cable 22 in the same manner as the first and second embodiments. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment have been omitted for the sake of brevity.

In this third illustrated embodiment, the restricting member or pin 216 is rotatably mounted with respect to a shifter housing 218' to switch the restricting member 216 between the non-shift restricting position and the shift restricting position by rotating the restricting member 216 ninety degrees.

Figure 24:
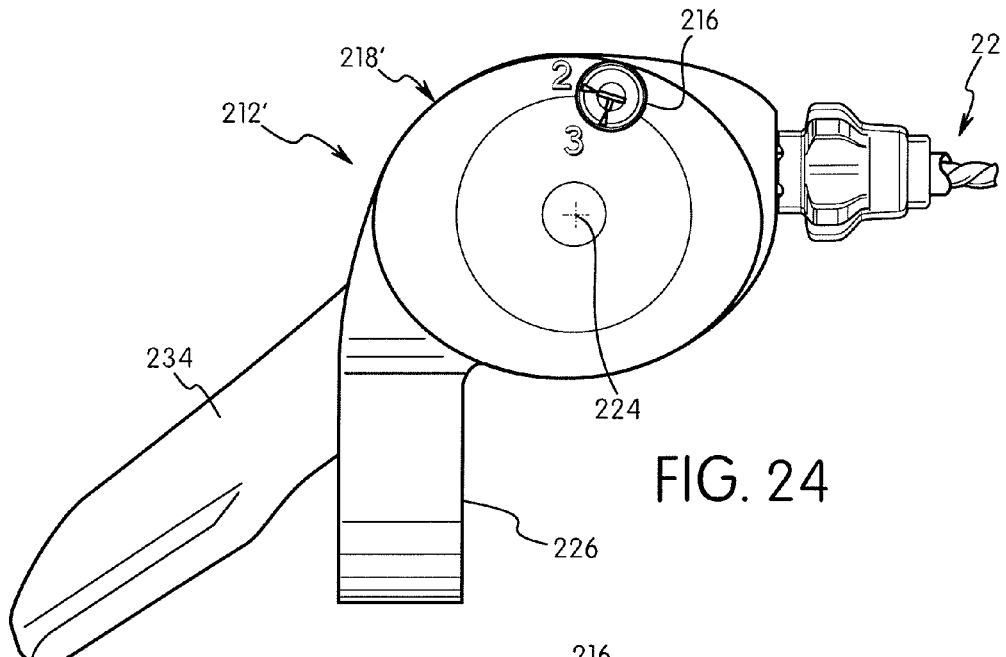
FIG. 24 is a top plan view of a bicycle shift control device illustrated in accordance with a third embodiment with a shift switching arrangement in a non-shift restricting position.
Figure 25:
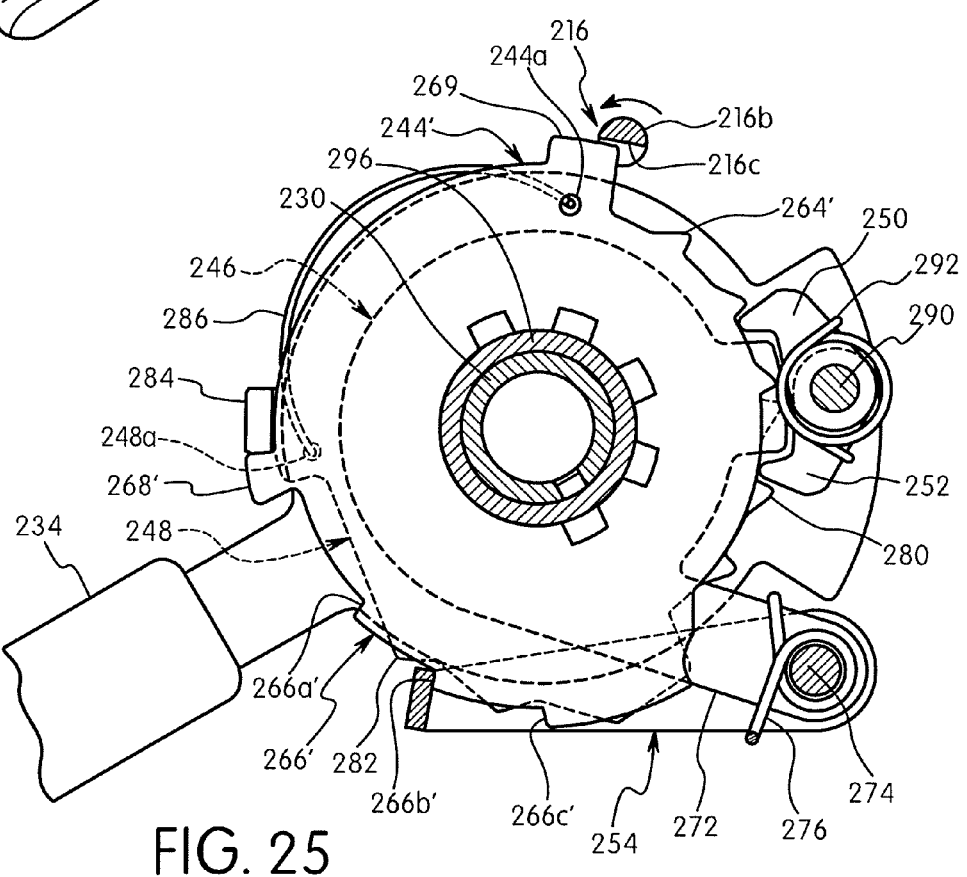
FIG. 25 is a top schematic view of selected parts the bicycle shift control device illustrated in FIG. 24 with the shift switching arrangement in the non-shift restricting position.
Figure 26:
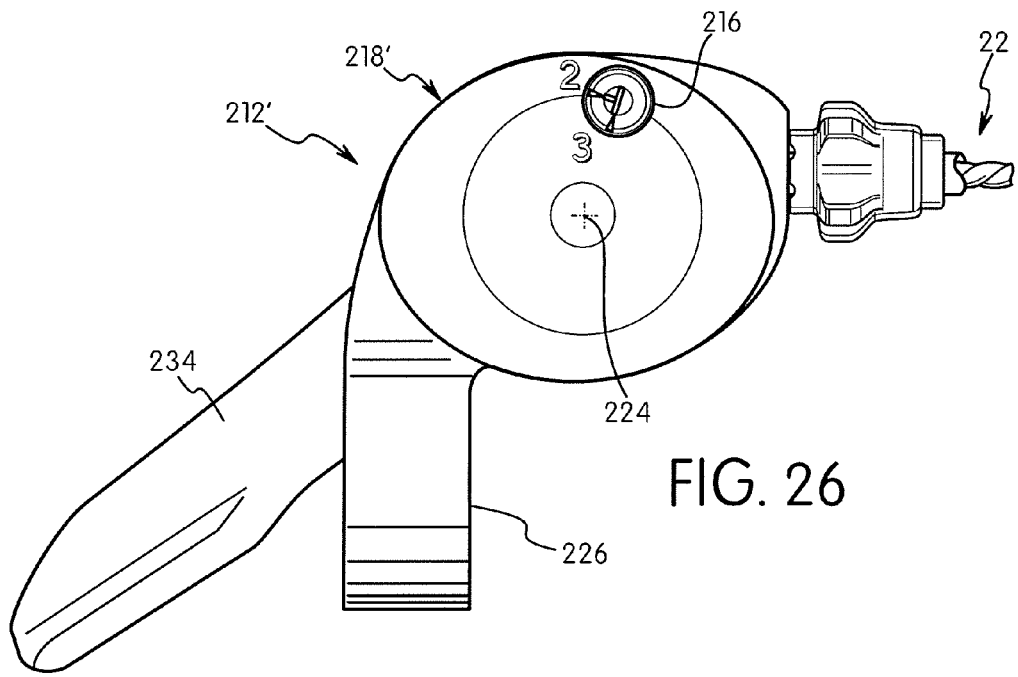
FIG. 26 is a top plan view of the bicycle shift control device illustrated in FIGS. 24 and 25 with the shift switching arrangement in a shift restricting position.
Figure 27:
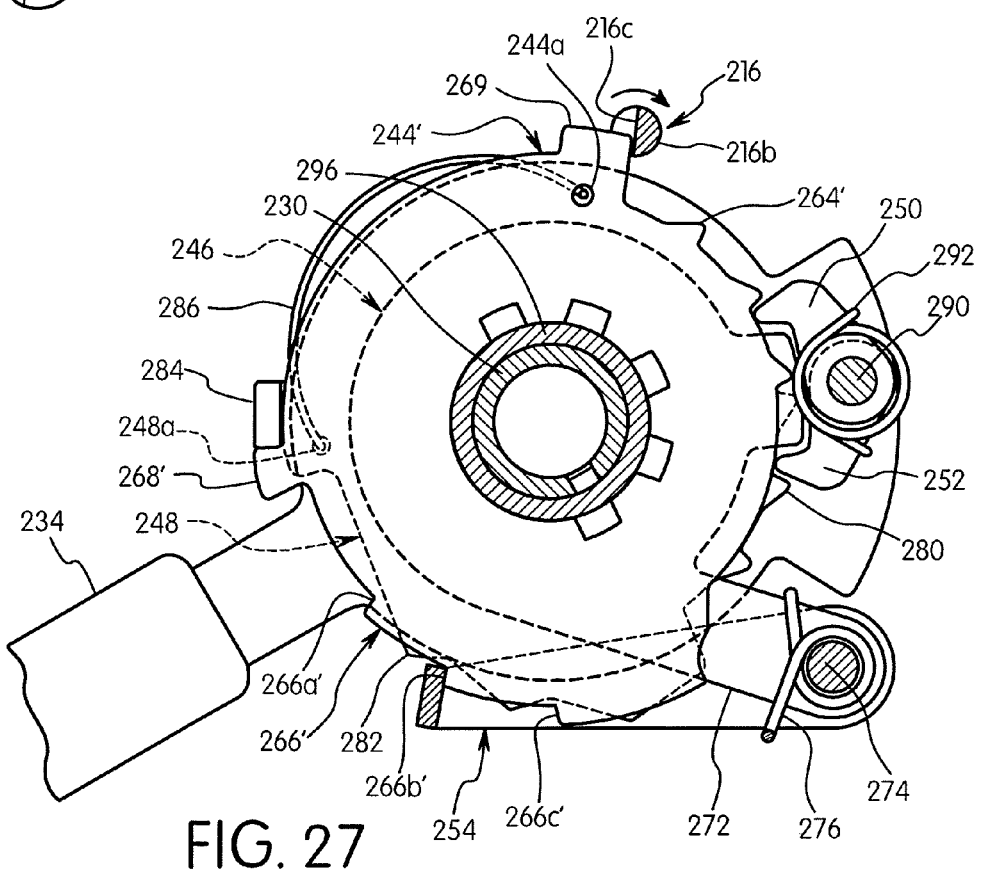
FIG. 27 is a top schematic view of selected parts the bicycle shift control device illustrated in FIGS. 24 to 26 with the shift switching arrangement in the shift restricting position.

In the illustrated embodiment, the winding plate 244' is a flat plate with a peripheral edge that includes three winding teeth 264', three positioning teeth 266' with abutments 266a'-266c', a stop 268' and an abutment 269. The winding teeth 264', the positioning teeth 266' and the stop 268' are identical to the winding teeth 264, the positioning teeth 266 and the stop 268 of the winding plate 244. The abutment 269 is arranged to contact the restricting member 216 (i.e., the control shaft 216b) when the restricting member 216 is in the shift restricting position (FIGS. 26 and 27). Basically, the restricting member 216 restricts rotational movement of the wire takeup member 242 by contacting the abutment 269 of the winding plate 244' to prohibit the gear shifting mechanism 232 from engaging the last gear position (i.e., corresponding to the positioning pawl 254 engaging the abutment 266c' in this embodiment) when the restricting member 216 is in the shift restricting position. On the other hand, when the restricting member 216 is in the non-shift restricting position, the cutout 216c of the control shaft 216b is positioned within a movement path of the abutment 269 of the winding plate 244'. Thus, in the non-shift restricting position, the winding plate 244' can rotate such that when the positioning pawl 254 moves radially outward with respect to the center axis of the winding plate 244' to disengage from the abutment 266b' of the middle positioning tooth of the positioning teeth 266', the winding plate 244' rotates in the release direction R1 so that the abutment 266c' of the positioning tooth of the positioning teeth 266' that corresponds to the last gear position engages the positioning pawl 254. Thus, in this third illustrated embodiment, the restricting member 38 is movable between the non-shift restricting position (FIGS. 24 and 25) and the shift restricting position (FIGS. 26 and 27) in the same manner as the second embodiment such that the gear shifting mechanism can be shifted between a first set of operating positions (i.e., three operating positions) as seen in FIGS. 24 and 25 and a second set of operating positions (i.e., only two operating positions) as seen in FIGS. 26 and 27.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle shift control device comprising:
a shifter housing;
a gear shifting mechanism disposed in the shifter housing with the gear shifting mechanism having a plurality of gear shift positions;
a shift operating member operatively connected to the gear shifting mechanism, the shift operating member being movable with respect to the shifter housing to operate the gear shifting mechanism; and
a shift switching arrangement including a restricting member movably mounted with respect to the shifter housing between a non-shift restricting position and a shift restricting position,
the gear shifting mechanism being arranged to move in a first set of the gear shift positions when the restricting member is in the non-shift restricting position, and to move in a second set of the gear shift positions different from the first set of the gear shift positions when the restricting member is in the shift restricting position.

2. The bicycle shift control device according to claim 1, wherein
the second set of the gear shift positions has a fewer number of the gear shift positions than those of the first set of the gear shift positions.

3. The bicycle shift control device according to claim 2, wherein
the gear shifting mechanism includes at least a pair of end gear shift positions, with the restricting member preventing the gear shifting mechanism from being shifted to one of the end gear shift positions when the restricting member is in the shift restricting position.

4. The bicycle shift control device according to claim 1, wherein
the shift switching arrangement includes a user operable part that is accessible through the shifter housing without disassembling the bicycle shift control device, the user operable part being movably mounted with respect to the shifter housing to switch the restricting member between the non-shift restricting position and the shift restricting position.

5. The bicycle shift control device according to claim 1, wherein
the gear shifting mechanism includes a mechanical arrangement that includes a wire takeup member movably mounted with respect to the shifter housing, a plurality of positioning teeth that move with the wire takeup member, and a positioning pawl movably arranged with respect to the shifter housing to selectively engage the positioning teeth to attain the plurality of gear shift positions by preventing the wire takeup member from moving with respect to the shifter housing in a wire release direction when the positioning pawl is engaged with one of the positioning teeth.

6. The bicycle shift control device according to claim 5, wherein
the restricting member restricts movement of the positioning pawl out of engagement from one of the positioning teeth to prohibit the gear shifting mechanism from moving from a currently engaged gear shift position when the restricting member is in the shift restricting position.

7. The bicycle shift control device according to claim 6, wherein
the restricting member includes a control shaft with a cutout, with the control shaft being movably mounted such that the control shaft blocks movement of the positioning pawl out of engagement from one of the positioning teeth when the restricting member is in the shift restricting position, and such that the cutout of the control shaft is positioned within a movement path of the positioning pawl to permit the positioning pawl from being disengaged from the one of the positioning teeth when the restricting member is in the non-shift restricting position.

8. The bicycle shift control device according to claim 5, wherein
the restricting member restricts rotational movement of the wire takeup member when the restricting member is in the shift restricting position.

9. The bicycle shift control device according to claim 8, wherein
the restricting member includes a control shaft with a cutout, with the control shaft being movably mounted such that the control shaft blocks movement of the wire takeup member when the restricting member is in the shift restricting position, and such that the cutout of the control shaft is positioned within a movement path of the wire takeup member to permit the wire takeup member to move in the first set of the gear shift positions when the restricting member is in the non-shift restricting position.

10. The bicycle shift control device according to claim 1, wherein
the restricting member prevents the gear shifting mechanism from attaining at least one of the gear shift positions by operation of the shift operating member while the restricting member is in the shift restricting position and selectively permits the gear shifting mechanism to attain all of the gear shift positions by operation of the shift operating member while the restricting member is in the non-shift restricting position.

11. The bicycle shift control device according to claim 1, wherein
the gear shifting mechanism includes a positioning pawl movably arranged with respect to the shifter housing along a movement path, and
the restricting member restricts movement of the positioning pawl to prohibit the gear shifting mechanism from moving from a currently engaged gear shift position while the restricting member is in the shift restricting position, the current engaged gear shift position being a position of the gear shifting mechanism while the shift operating member is at a rest position.

12. A bicycle shift control device comprising:
a shifter housing;
a gear shifting mechanism disposed in the shifter housing with the gear shifting mechanism having a plurality of operating positions;
a shift operating member operatively connected to the gear shifting mechanism, the shift operating member being movable with respect to the shifter housing to operate the gear shifting mechanism; and
a shift switching arrangement including a restricting member movably mounted with respect to the shifter housing between a non-shift restricting position and a shift restricting position,
the gear shifting mechanism being arranged to move in a first set of the operating positions when the restricting member is in the non-shift restricting position, and to move in a second set of the operating positions different from the first set of the operating positions when the restricting member is in the shift restricting position,
the gear shifting mechanism including a positioning member movably arranged with respect to the shifter housing having a plurality of positioning teeth, and a positioning pawl movably arranged with respect to the shifter housing along a movement path, the positioning member having a plurality of positioning teeth being selectively engaged by the positioning pawl, and
the restricting member being positioned in the movement path of the positioning pawl and restricting an amount of movement of the positioning pawl along the movement path while the restricting member is in the shift restricting position.

13. The bicycle shift control device according to claim 12 wherein
the restricting member directly contacts the positioning pawl to restrict movement of the positioning pawl along the movement path while the restricting member is in the shift restricting position.

14. The bicycle shift control device according to claim 12, wherein
the restricting member restricts movement of the positioning pawl to a position of engagement with one of the positioning teeth by operation of the shift operating member.

15. A bicycle shift control device comprising:
a shifter housing;
a gear shifting mechanism disposed in the shifter housing with the gear shifting mechanism having a plurality of operating positions;
a shift operating member operatively connected to the gear shifting mechanism, the shift operating member being movable with respect to the shifter housing to operate the gear shifting mechanism, the shift operating member being a single shift lever movably arranged relative to the shifter housing in a first rotational direction from a rest position to perform a winding operation of the gear shifting mechanism and in a second rotational direction from the rest position to perform a release operation of the gear shifting mechanism; and
a shift switching arrangement including a restricting, member movably mounted with respect to the shifter housing between a non-shift restricting position and a shift restricting position,
the gear shifting mechanism being arranged to move in a first set of the operating positions when the restricting member is in the non-shift restricting position, and to move in a second set of the operating positions different from the first set of the operating positions when the restricting member is in the shift restricting position.

* * * * *